United States Patent
Jung et al.

(10) Patent No.: US 11,926,297 B2
(45) Date of Patent: *Mar. 12, 2024

(54) SYSTEM AND METHOD FOR PREDICTING NEGATIVE PRESSURE OF BRAKE BOOSTER OF VEHICLE

(71) Applicants: HYUNDAI MOTOR COMPANY, Seoul (KR); KIA MOTORS CORPORATION, Seoul (KR); HYUNDAI KEFICO CORPORATION, Gunpo-si (KR)

(72) Inventors: Tae Hun Jung, Seoul (KR); Young-Jin Kim, Seoul (KR)

(73) Assignees: HYUNDAI MOTOR COMPANY, Seoul (KR); KIA MOTORS CORPORATION, Seoul (KR); HYUNDAI KEFICO CORPORATION, Gunpo-si (KR)

(*) Notice: Subject to any disclaimer, the term of this patent is extended or adjusted under 35 U.S.C. 154(b) by 544 days.

This patent is subject to a terminal disclaimer.

(21) Appl. No.: 17/137,936

(22) Filed: Dec. 30, 2020

(65) Prior Publication Data

US 2021/0197789 A1 Jul. 1, 2021

(30) Foreign Application Priority Data

Dec. 30, 2019 (KR) .................. 10-2019-0178316
Apr. 27, 2020 (KR) .................. 10-2020-0050756

(51) Int. Cl.
*B60T 17/22* (2006.01)
*B60H 1/00* (2006.01)
(Continued)

(52) U.S. Cl.
CPC .......... *B60T 17/221* (2013.01); *B60H 1/0073* (2019.05); *F02N 11/0818* (2013.01);
(Continued)

(58) Field of Classification Search
CPC ............... B60T 17/221; B60T 2210/30; B60T 2220/04; B60T 2250/00; B60T 2250/04;
(Continued)

(56) References Cited

U.S. PATENT DOCUMENTS 6,305,757 B1 10/2001 Ohsaki et al.
6,393,345 B1 5/2002 Kerns et al.
(Continued)

FOREIGN PATENT DOCUMENTS

EP 1 114 927 B1 7/2006
EP 0 982 211 B1 2/2007

*Primary Examiner* — Xiao En Mo
(74) *Attorney, Agent, or Firm* — MORGAN, LEWIS & BOCKIUS LLP (57) ABSTRACT

A system for predicting a negative pressure of a brake booster of a vehicle includes: a driving information detector configured to detect driving information according to driving of the vehicle; and a controller configured to calculate a negative pressure of an intake manifold based on a pressure of the intake manifold and an atmospheric pressure that is the driving information and including a booster negative pressure predictor configured to predict the negative pressure of the brake booster by integrating over time a change rate according to a charging rate and a discharging rate of the negative pressure calculated using a previous negative pressure of the brake booster calculated in a previous cycle according to a logic for predicting the negative pressure of the brake booster and the negative pressure of the intake manifold and a brake pedal force of a current cycle.

18 Claims, 5 Drawing Sheets

(51) Int. Cl.
*F02N 11/08* (2006.01)
*G05B 13/04* (2006.01)

(52) U.S. Cl.
CPC ........ *G05B 13/048* (2013.01); *B60T 2210/30* (2013.01); *B60T 2220/04* (2013.01); *B60T 2250/00* (2013.01); *B60T 2250/04* (2013.01); *B60T 2270/413* (2013.01)

(58) Field of Classification Search
CPC .. B60T 2270/413; B60T 7/042; B60T 13/565; B60T 17/22; B60H 1/0073; F02N 11/0818; F02N 11/0822; F02N 2200/0807; G05B 13/048
See application file for complete search history.

(56) References Cited

U.S. PATENT DOCUMENTS

| | | |
|---|---|---|
| 6,741,918 B2 | 5/2004 | Kerns et al. |
| 6,990,858 B2 | 1/2006 | Kerns et al. |
| 8,726,872 B2 | 5/2014 | White et al. |
| 2016/0272205 A1* | 9/2016 | Kato ................... B60T 7/122 |
| 2016/0297415 A1* | 10/2016 | Kato ................... F02D 41/065 |
| 2019/0389279 A1* | 12/2019 | Jung ................... B60H 1/3216 |
| 2020/0031202 A1* | 1/2020 | Jung ................... B60W 10/06 |
| 2020/0180397 A1* | 6/2020 | Jung ................... B60H 1/3208 |

* cited by examiner

SYSTEM AND METHOD FOR PREDICTING NEGATIVE PRESSURE OF BRAKE BOOSTER OF VEHICLE

CROSS-REFERENCE TO RELATED APPLICATION

This application claims priority to and the benefit of Korean Patent Application No. 10-2019-0178316 filed in the Korean Intellectual Property Office on Dec. 30, 2019, and Korean Patent Application No. 10-2020-0050756 filed in the Korean Intellectual Property Office on Apr. 27, 2020, the entire contents of which are incorporated herein by reference.

TECHNICAL FIELD

The present disclosure relates to a brake booster negative pressure prediction system and a method thereof, and more particularly, to a system and a method for predicting a negative pressure of a brake booster of a vehicle capable of improving cooling performance and braking performance of the vehicle in which a booster sensor is omitted.

BACKGROUND

In general, when a negative pressure stored in a brake booster of a vehicle is insufficient, a brake pedal of the vehicle is hardened so that a risk of an accident increases. In order to improve this problem, a logic to recover the brake negative pressure by stopping an operation of various auxiliary devices such as an air conditioner (A/C) is applied in a situation where the brake negative pressure is insufficient.

A compressor included in the air conditioner affects an engine load of the vehicle because the compressor uses a power of an engine of the vehicle. When the brake negative pressure falls below a certain value, an operation of the air conditioner is stopped or cut to secure a driving power required for the brake negative pressure.

The brake negative pressure is a pressure stored in an actual brake booster and an actual measured value measured using a real booster sensor. However, in order to perform the control for stopping an operation of the air conditioner, many manufacturers use a negative pressure of an intake manifold of the vehicle, which generates a negative pressure of the brake booster, instead of using the real booster sensor due to problems such as cost increase. The negative pressure of the intake manifold means a difference between an atmospheric pressure and a pressure of the intake manifold.

However, in the case of using the intake manifold negative pressure of the intake manifold, an operation of the air conditioner is frequently stopped because the negative pressure of the intake manifold is calculated less even when sufficient pressure is stored in the brake booster.

When a vehicle that does not have the booster sensor raises a reference pressure for the control for stopping an operation of the air conditioner using the negative pressure of the intake manifold, there is a problem that cooling performance is deteriorated due to frequent stop of the air conditioner. When the reference pressure is lowered, a frequency of stop of the air conditioner is decreased, but braking performance is deteriorated.

Therefore, the control for stopping the operation of the air conditioner using the negative pressure of the intake manifold needs to be corrected.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a system and a method for predicting a negative pressure of a brake booster of a vehicle capable of improving cooling performance and braking performance of the vehicle through a logic for predicting a negative pressure of a brake booster that uses a charging rate and a discharging rate of the negative pressure generated based on a negative pressure of an intake manifold and a brake pedal force of the vehicle which does not include a brake booster sensor.

An exemplary embodiment of the present disclosure may provide the system for predicting the negative pressure of the brake booster of the vehicle, including: a driving information detector configured to detect driving information according to driving of the vehicle; and a controller configured to calculate a negative pressure of an intake manifold based on a pressure of the intake manifold and an atmospheric pressure that is the driving information and including a booster negative pressure predictor configured to predict the negative pressure of the brake booster by integrating over time a change rate according to a charging rate and a discharging rate of the negative pressure calculated using a previous negative pressure of the brake booster calculated in a previous cycle according to a logic for predicting the negative pressure of the brake booster and the negative pressure of the intake manifold and a brake pedal force of a current cycle.

When the predicted negative pressure of the brake booster is less than or equal to a reference negative pressure of a control for stopping an operation of an air conditioner of the vehicle, the controller may be configured to determine that the predicted negative pressure of the brake booster is insufficient to stop the operation of the air conditioner.

The driving information detector may be configured to detect the driving information from at least one of a vehicle speed sensor, a vehicle acceleration sensor, an intake manifold pressure sensor, a gear stage sensor, an accelerator pedal sensor, a brake pedal operation sensor, a brake pedal force sensor, a timer, and an atmospheric pressure sensor.

The booster negative pressure predictor may be configured to collect the negative pressure of the intake manifold and the driving information and generate the negative pressure of the brake booster predicted in a cycle of a time period.

The booster negative pressure predictor may include: a charging model module configured to calculate a first differential pressure over time using the negative pressure of the brake booster calculated in the previous cycle and the negative pressure of the intake manifold of the current cycle; a discharging model module configured to take a difference between the negative pressure of the brake booster calculated in the previous cycle and the negative pressure of the intake manifold of the current cycle as a basic factor, and compensate for the basic factor using the brake pedal force to calculate a second differential pressure over time; a summing module configured to calculate a change rate by adding a discharging rate of the negative pressure of the brake booster corresponding to the second differential pressure to a charging rate of the negative pressure of the brake booster corresponding to the first differential pressure; and an integration module configured to integrate the change rate over time and output the predicted negative pressure of the brake booster.

The charging rate of the negative pressure of the brake booster according to the first differential pressure may be output as a positive value, and the discharging rate of the negative pressure of the brake booster according to the second differential pressure may be output as a negative value.

The charging model module may be configured to calculate the charging rate using a control map using the first differential pressure as an input value.

The discharging model module may be configured to calculate a multiplication factor for correcting the discharging rate using a correction map using a displacement change amount of the brake pedal force as an input value.

When repeated braking due to an on state and an off state of a brake operation signal continuously occurs, the discharging model module may be configured to use an additional correction amount to increase the discharging rate.

The discharging model module may be configured to use an additional correction amount to increase the discharging rate when the discharging model module continuously detects that acceleration of the vehicle or speed of the vehicle has an amplitude greater than or equal to a reference amplitude.

The integration module may be configured to feedback the predicted negative pressure of the brake booster to the charging model module the discharging model module so that the predicted negative pressure is used to calculate a charging rate and a discharging rate of a next cycle generated after the current cycle.

The controller may be configured to restart the vehicle in a state in which start of the vehicle is stopped by an idle stop and go (ISG) system when the predicted negative pressure of the brake booster is less than or equal to a reference negative pressure.

An exemplary embodiment of the present disclosure may provide the method for predicting the negative pressure of the brake booster of the vehicle, including: a) collecting, by a controller, driving information according to driving of the vehicle to calculate a negative pressure of an intake manifold based on a pressure of the intake manifold and an atmospheric pressure; b) calculating, by the controller, a first differential pressure over time using a negative pressure of the brake booster calculated in a previous cycle and the negative pressure of the intake manifold of a current cycle; c) taking, by the controller, a difference between the negative pressure of the brake booster calculated in the previous cycle and the negative pressure of the intake manifold of the current cycle as a basic factor to calculate a second differential pressure over time by compensating for the basic factor using the brake pedal force; and d) calculating, by the controller, a change rate by adding a discharging rate of the negative pressure of the brake booster corresponding to the second differential pressure to a charging rate of the negative pressure of the brake booster corresponding to the first differential pressure to predict the negative pressure of the brake booster by integrating the change rate over time.

Step b) may include: setting, by the controller, an initial negative pressure of the brake booster generated when the previous cycle does not exist as a value less than the negative pressure of the intake manifold.

Step b) may include: calculating, by the controller, the charging rate using a control map using the first differential pressure as an input value.

Step c) may include: calculating, by the controller, a multiplication factor for correcting the discharging rate using a correction map using a displacement change amount of the brake pedal force as an input value.

The method for predicting the negative pressure of the brake booster of the vehicle may further include: after step d), when the predicted negative pressure of the brake booster is less than or equal to a reference negative pressure of a control for stopping an operation of an air conditioner of the vehicle, determining, by the controller, that the predicted negative pressure of the brake booster is insufficient to stop the operation of the air conditioner.

The method for predicting the negative pressure of the brake booster of the vehicle may further include: after step d), restarting, by the controller, the vehicle in a state in which start of the vehicle is stopped by an idle stop and go (ISG) system when the predicted negative pressure of the brake booster is less than or equal to a reference negative pressure.

The system and the method for predicting the negative pressure of the brake booster of the vehicle according to the exemplary embodiment of the present disclosure may implement the logic for predicting the negative pressure of the brake booster so that the exemplary embodiment of the present disclosure improves cooling performance and braking performance of the vehicle without cost increase due to addition of hardware.

The exemplary embodiment of the present disclosure may calculate the negative pressure of the brake booster based on the charging rate and the discharging rate modeled according to a change of a brake pedal force signal of a driver of the vehicle so that the exemplary embodiment of the present disclosure improves accuracy of the negative pressure of the brake booster to a level similar to a level of an actual measured value of the brake booster sensor.

Further, the exemplary embodiment of the present disclosure may forcibly reduce a predicted value of the negative pressure of the brake booster by detecting a repeated braking situation in which the brake pedal force signal is continuously changed and an acceleration signal of the vehicle is continuously changed more than or equal to a reference amplitude so that the exemplary embodiment of the present disclosure prevents a failure in which the predicted value exceeds the actual measured value.

DETAILED DESCRIPTION OF THE EMBODIMENTS

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Throughout the specification, terms such as "first", "second", "A", "B", etc. may be used to describe various elements, but the elements should not be limited by the terms. These terms are intended to distinguish one element from other elements, but the nature and the order or sequence of the elements is not limited by those terms.

Throughout the specification, a brake pedal force (or a brake pedal effort) and a brake pedal pressure have a same meaning, and a pedal means a brake pedal unless otherwise stated.

A system for predicting a negative pressure of a brake booster of a vehicle (or a device for predicting the negative pressure of the brake booster of the vehicle) and a method for predicting the negative pressure of the brake booster of the vehicle according to an exemplary embodiment of the present disclosure will now be described in detail with reference to the drawings.

A method of deriving a value of a virtual brake booster sensor for solving a problem that occurs in a control for stopping an operation of an air conditioner (A/C) of a vehicle using a negative pressure of an intake manifold of the vehicle will be described as follows.

The method may derive the virtual brake booster sensor value by modeling a change of the negative pressure of the brake booster according to the negative pressure of the intake manifold of the vehicle and an acceleration of the vehicle so that the method reduces a frequency of stop of the air conditioner.

However, since the method uses only the negative pressure of the intake manifold and the acceleration of the vehicle as basic factors for predicting a brake negative pressure (or a pressure of the brake booster), it is difficult to predict a change in the brake negative pressure due to a change of a brake pedal operation pattern of the vehicle when the vehicle decelerates with the acceleration.

Figure 1:
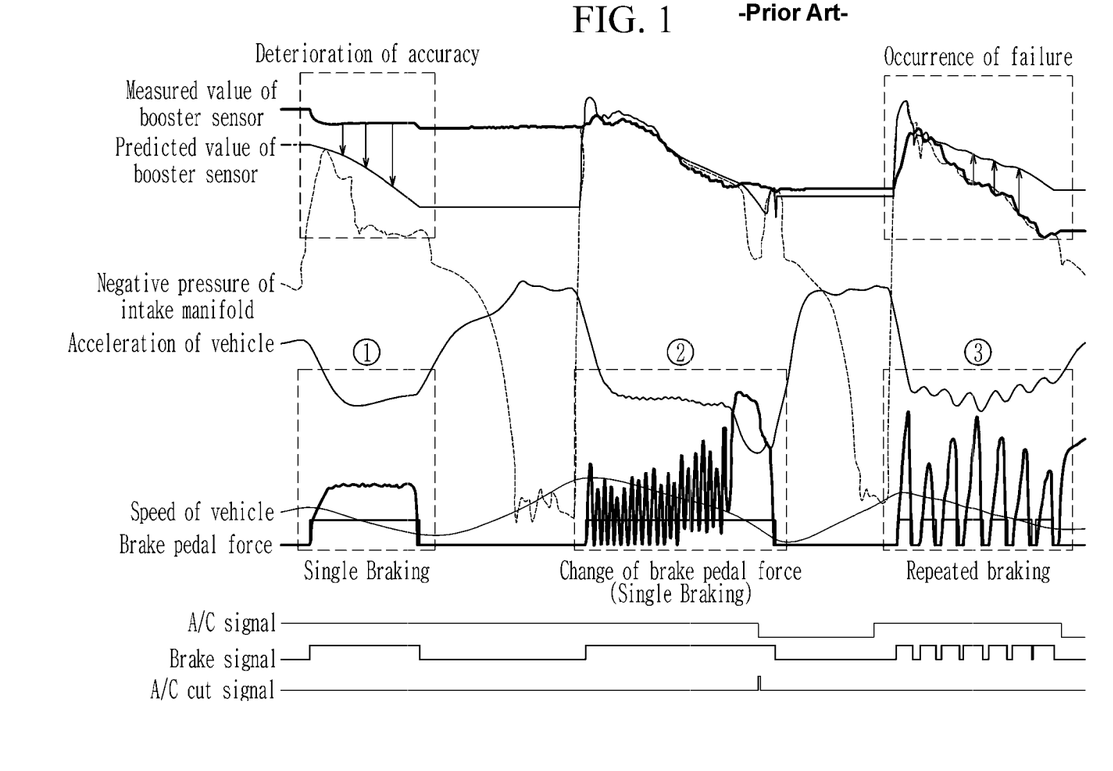
FIG. 1 is a graph explaining prediction limit of a virtual brake negative pressure.

FIG. 1 is a graph explaining prediction limit of a virtual brake negative pressure.

Referring to FIG. 1, in order to verify the method of deriving the virtual brake booster sensor value (or a predicted value of the brake booster sensor), the virtual booster sensor value and an actual booster sensor value according to a change in the brake pedal operation pattern of the vehicle are compared. The actual booster sensor value may be a measured value of the brake booster sensor.

Conditions ①, ②, and ③ of FIG. 1 represent different booster pressure changes according to the change in the brake pedal operation pattern in a situation where the vehicle is decelerated with similar acceleration. It is difficult to predict a change in the booster pressure by referring to the brake pedal force signal.

The condition ① shown as ① in FIG. 1 is a case where the brake pedal of the vehicle is constantly pressed during a single brake operation. The condition ② shown as ② in FIG. 1 is a case where a pressure of the brake pedal is frequently changed during a single brake operation. The condition ③ shown as ③ in FIG. 1 is a case where an on operation and an off operation of the brake pedal are repeated. It is ideal that the virtual booster sensor value (or the predicted value) is close to the actual booster sensor value (or the measured value). A degree of similarity is defined as accuracy. A risk situation in which the predicted value exceeds or reverses the measured value in a situation where the measured value is insufficient is defined as a failure. Considering safety of the vehicle, the accuracy has to be high and the failure does not have to exist or has to be 0%.

In the case of the condition ①, the measured value hardly decreases, but the predicted value calculated based on the negative pressure of the intake manifold and the acceleration rapidly decreases. Thus, the accuracy is deteriorated. In the case of the condition ②, the measured value and the predicted value is similar. In the case of the condition ③, the predicted value exceeds the measured value so that the failure occurs.

As described above, it is difficult to model or predict the change in the booster negative pressure only with the negative pressure of the intake manifold and the acceleration of the vehicle. Thus, the system and the method for predicting the negative pressure of the brake booster of the vehicle according to an exemplary embodiment of the present disclosure are provided.

Figure 2:
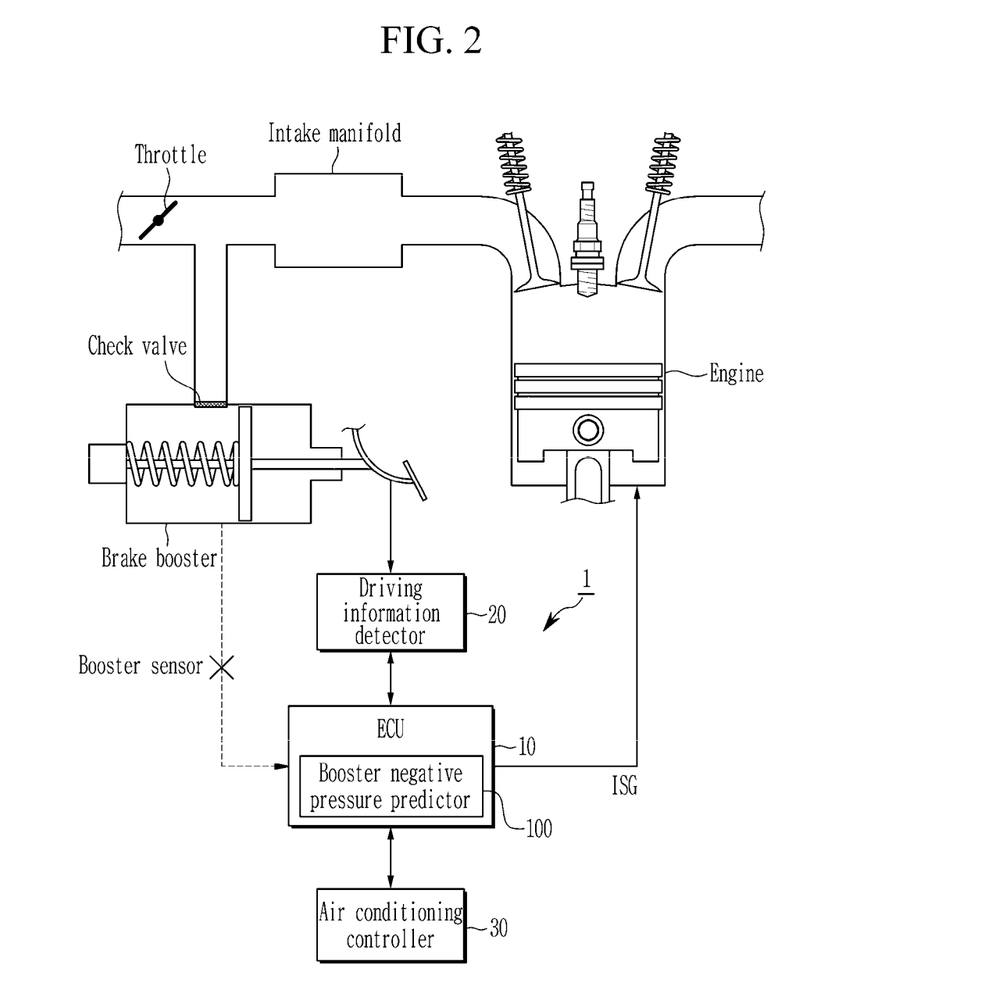
FIG. 2 shows a configuration of a system for predicting a negative pressure of a brake booster of a vehicle according to an exemplary embodiment of the present disclosure.

FIG. 2 shows a configuration of the system for predicting the negative pressure of the brake booster of the vehicle according to an exemplary embodiment of the present disclosure.

Figure 3:
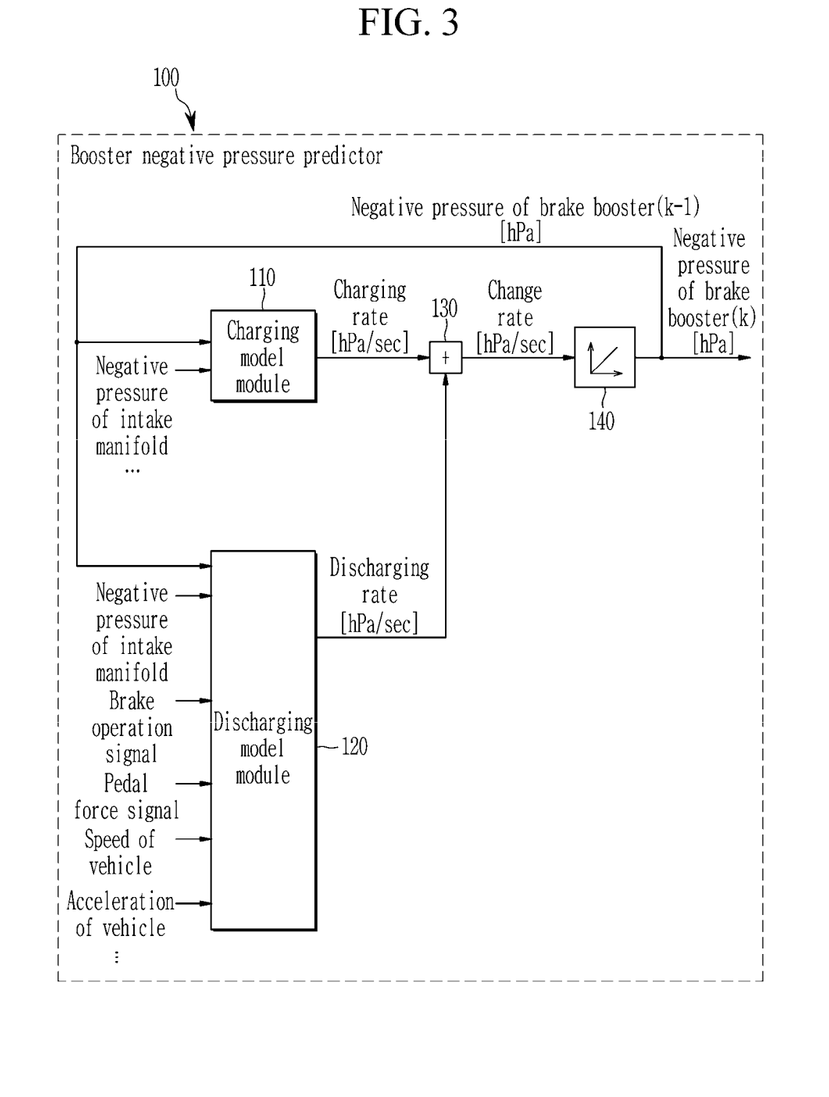
FIG. 3 is a block diagram showing a configuration of a booster negative pressure predictor according to an exemplary embodiment of the present disclosure.

FIG. 3 is a block diagram showing a configuration of a booster negative pressure predictor according to an exemplary embodiment of the present disclosure.

Referring to FIG. 2 and FIG. 3, the system for predicting the negative pressure of the brake booster of the vehicle 1 may be applied to a vehicle in which a brake booster sensor measuring the negative pressure of the brake booster is omitted, and may include a controller (e.g., an engine control unit (ECU)) 10 including a booster negative pressure predictor 100, a driving information detector 20, and an air conditioning controller 30.

The controller 10 may calculate a virtual negative pressure of the brake booster according to a logic for predicting the negative pressure of the brake booster, and may use driving information detected according to an operation of the vehicle to perform a control for reducing a frequency of stop of an air conditioner (A/C) of a vehicle using a predicted negative pressure of the brake booster.

The controller 10 may calculate the negative pressure of the intake manifold by subtracting a pressure of the intake manifold from an atmospheric pressure that is the driving information. The negative pressure of the intake manifold may be stored in the brake booster. The controller 10 may derive a virtual brake booster sensor value by modeling or predicting a change in a negative pressure of the brake booster according to at least one of the negative pressure of the intake manifold of the vehicle, acceleration of the vehicle, and a displacement change signal of the brake pedal force of the vehicle.

The controller 10 may include the booster negative pressure predictor 100 that predicts a negative pressure of the brake booster similar to an actual measured value or a measured value based on the logic for predicting the negative pressure of the brake booster.

The booster negative pressure predictor 100 may predict a current negative pressure k of the brake booster by integrating over time a change rate according to a charging rate and a discharging rate modeled (or calculated) using a negative pressure k−1 of the brake booster calculated in a previous cycle according to the logic for predicting the negative pressure of the brake booster and a negative pressure of the intake manifold and the brake pedal force of a current cycle.

The controller 10 may store various programs and data for driving the booster negative pressure predictor 100 and reducing a frequency of stop of the air conditioner using the booster negative pressure predictor in a memory, and may update data generated according to an operation of the controller.

The controller 10 may store a program of the booster negative pressure predictor 100 in the memory, and may use a negative pressure of the brake booster derived according to execution of the program to reduce the frequency of stop of the air conditioner.

The driving information detector 20 may detect driving information measured by various sensors and various controllers according to a driving state of the vehicle. The driving information may be data measured by various sensors and controllers or information generated when the measured data is processed in a form necessary for control.

For example, the driving information detector 20 may detect the driving information from a vehicle speed sensor, a vehicle acceleration sensor, a gear stage sensor, an accelerator pedal sensor, a brake pedal sensor (or a brake pedal operation sensor), a brake pedal pressure sensor (or a brake pedal force sensor), an altitude sensor, a slope sensor, a timer, or an atmospheric pressure sensor.

The air conditioning controller 30 may control an overall operation of the air conditioner (A/C), and may perform a control for reducing a frequency of stop of the air conditioner according to a signal applied by the controller 10. The air conditioner may include a compressor that compresses refrigerant, a condenser that condenses and liquefies the compressed refrigerant, and a vaporizer that vaporizes the liquefied refrigerant. The compressor, the condenser, and the vaporizer are known elements Referring to FIG. 3, the booster negative pressure predictor 100 may include a charging model module (or a filling model module) 110, a discharging model module 120, a summing module 130, and an integration module 140.

The booster negative pressure predictor 100 may collect the negative pressure of the intake manifold and the driving information in real time, and may generate the negative pressure k of the brake booster at a cycle of a predetermined time period.

The booster negative pressure predictor 100 may include the charging model module 110 that calculates the charging rate and the discharging model module 120 that calculates a discharging rate. The booster negative pressure predictor 100 may predict the negative pressure k of the brake booster by integrating the change rate that is a sum of the charging rate and the discharging rate.

The charging model module 110 or the discharging model module 120 may receive the negative pressure k−1 of the brake booster calculated in the previous cycle, and the driving information including a negative pressure of the intake manifold, a brake operation signal, a brake pedal force signal, speed of the vehicle, and acceleration of the vehicle of the current cycle.

The charging model module 110 may calculate a first differential pressure over time using the negative pressure k−1 of the brake booster modeled (or calculated) in the previous cycle and a current negative pressure of the intake manifold. The first differential pressure may be output as a positive value that is the charging rate (hPa/sec) of the booster negative pressure. The charging model module 110 may calculate the charging rate (hPa/sec) of the booster negative pressure using a predetermined control map (or a predetermined control lookup table) using the first differential pressure as an input value.

A difference between the current negative pressure of the intake manifold and the negative pressure k−1 of the brake booster modeled or output in the previous cycle may be used as a main input factor. The charging model module 110 may calculate the charging rate (hPa/sec) by reflecting additional correction factors referring to the driving information.

The discharging model module 120 may take a difference between the negative pressure k−1 of the brake booster modeled in the previous cycle and the current negative pressure of the intake manifold as a basic factor, and may compensate for the basic factor using the brake pedal force signal to calculate a second differential pressure over time. The second differential pressure may be output as a negative value that is the discharging rate (hPa/sec) of the booster negative pressure. The brake pedal force signal may have the compensation value proportional to its change. The discharging model module 120 may calculate a multiplication factor for correcting the discharging rate of the booster negative pressure using a predetermined correction map using a displacement change amount of the brake pedal force as an input value.

The summing module 130 may calculate the change rate by adding the discharging rate of the second differential pressure calculated in the discharging model module 120 to the charging rate of the first differential pressure calculated in the charging model module 110.

The integration module 140 may integrate the change rate calculated by the summing module 130 over time to output the predicted negative pressure k of the brake booster.

The integration module 140 may feedback or transmit the predicted negative pressure of the brake booster to the charging model module 110 and the discharging model module 120 so that the predicted negative pressure is used to calculate a charging rate and a discharging rate of a next cycle.

When repeated braking due to an on state and an off state of the brake operation signal (or a brake signal) continuously occurs, the discharging model module 120 may reflect or use a predetermined additional correction amount to increase the discharging rate of the booster negative pressure. In more details, the discharging model module 120 may increase the discharging rate that is the negative value to forcibly reduce the negative pressure k of the brake booster when the discharging model module detects the repeated braking according to a continuous operation of the brake pedal shown as the condition ③ of FIG. 1. Thus, the failure may be prevented.

The discharging model module 120 may reflect or use a predetermined additional correction amount to increase the discharging rate of the booster negative pressure when the discharging model module continuously detects that acceleration of the vehicle or speed of the vehicle has an amplitude greater than or equal to a reference amplitude. Control stability of the negative pressure k of the brake booster calculated according to the change of the brake pedal force may be secured.

When the negative pressure k of the brake booster predicted by the booster negative pressure predictor 100 is less than or equal to a reference negative pressure of the control for stopping the operation of the air conditioner, the controller 10 may determine that the booster negative pressure is insufficient to stop the operation of the air conditioner.

Based on the configuration of the above-described system for predicting the negative pressure of the brake booster, a method for predicting the negative pressure of the brake booster of the vehicle according to an exemplary embodiment of the present disclosure will be described.

The controller 10 may be implemented as at least one processor that operates the booster negative pressure predictor 100 using a program. The program may perform each step of the method for predicting the negative pressure of the brake booster of the vehicle according to an exemplary embodiment of the present disclosure.

Therefore, in the following description of the method for predicting the negative pressure of the brake booster according to an exemplary embodiment of the present disclosure, the subject or a main agent of the method may be the controller 10, and the method may perform the control for reducing a frequency of stop of the air conditioner using the predicted negative pressure k of the brake booster.

Figure 4:
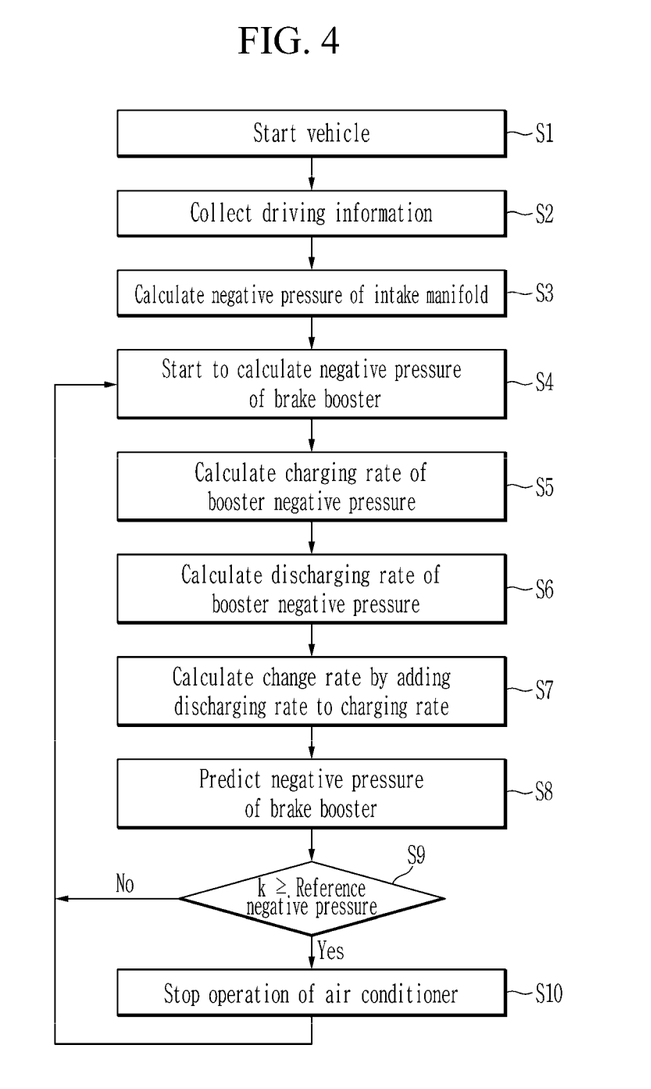
FIG. 4 is a flowchart showing a method for predicting the negative pressure of the brake booster of the vehicle according to an exemplary embodiment of the present disclosure.
Figure 5A:
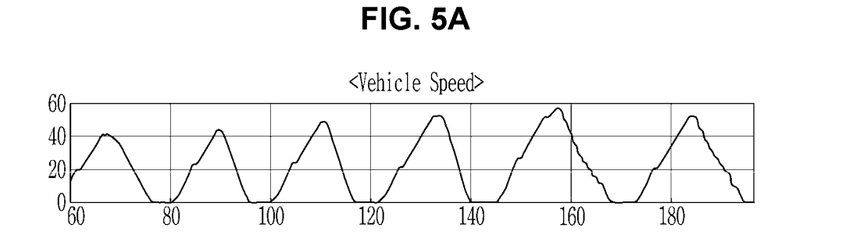
FIGS. 5A-5D are graphs showing a result of predicting the negative pressure of the brake booster according to an exemplary embodiment of the present disclosure.
Figure 5B:
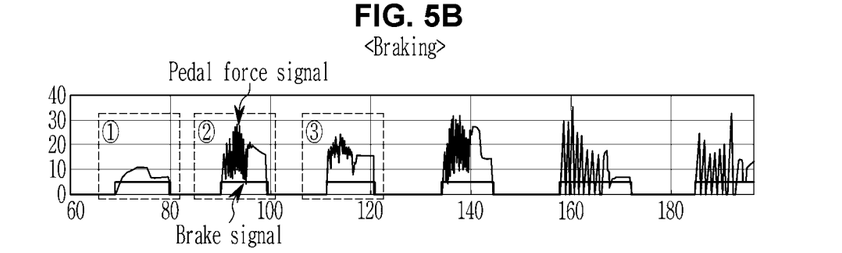
Figure 5C:
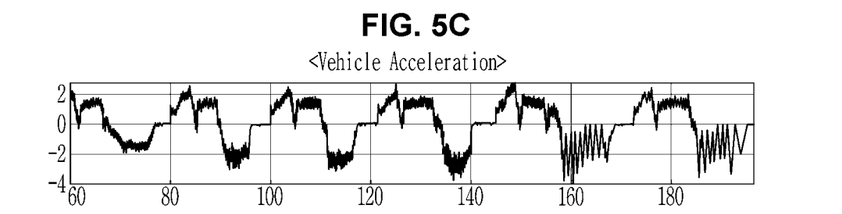
Figure 5D:
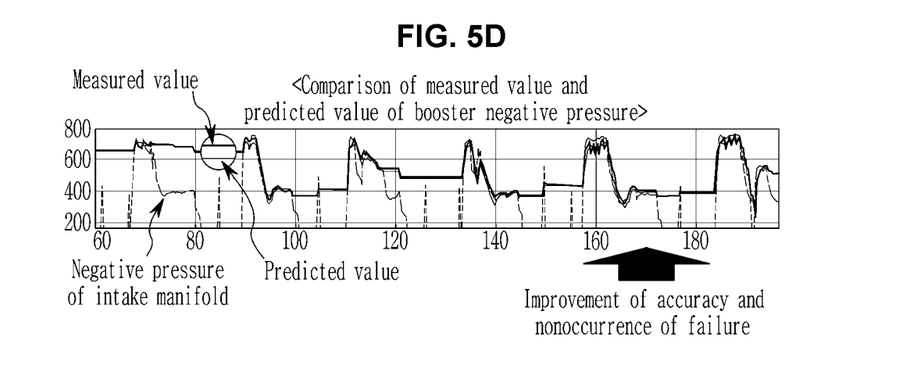

FIG. 4 is a flowchart showing the method for predicting the negative pressure of the brake booster of the vehicle according to an exemplary embodiment of the present disclosure.

Referring to FIG. 4, the controller 10 of the system for predicting the negative pressure of the brake booster of the vehicle 1 may continuously collect the driving information of the vehicle from the driving information detector 20 after the vehicle is started (steps S1 and S2). The driving information may include at least one of the atmospheric pressure, the vehicle speed, the vehicle acceleration, an accelerator pedal operation signal, the brake operation signal, the brake pedal force signal, an altitude, a slope, or a time according to an operation (or a driving) of the vehicle.

The controller 10 may calculate the negative pressure of the intake manifold by subtracting the pressure of the intake manifold from the atmospheric pressure that is the driving information (step S3).

The controller 10 may operate the timer so that the controller starts to calculate the negative pressure k of the brake booster using the driving information and the negative pressure of the intake manifold collected in the current cycle and the negative pressure k−1 of the brake booster calculated in the previous cycle (step S4). The controller 10 may set an initial negative pressure of the brake booster generated when the previous cycle does not exist as a value less than the negative pressure of the intake manifold.

The controller 10 may calculate the first differential pressure over time using the negative pressure k−1 of the brake booster calculated in the previous cycle and the current negative pressure of the intake manifold to calculate the charging rate of the booster negative pressure (step S5).

The controller 10 may take the difference between the negative pressure k−1 of the brake booster calculated in the previous cycle and the current negative pressure of the intake manifold as the basic factor and may compensate for the basic factor using the brake pedal force signal to calculate the second differential pressure over time so that the controller calculates the discharging rate of the booster negative pressure (step S6). The controller 10 may calculate the multiplication factor for correcting the discharging rate of the booster negative pressure using the correction map using the displacement change amount of the brake pedal force as the input value.

The controller 10 may calculate the change rate by adding the discharging rate of the second differential pressure to the charging rate of the first differential pressure (step S7).

The controller 10 may integrate the calculated change rate over time to generate the predicted negative pressure k of the brake booster (step S8). The controller 10 may store the predicted negative pressure of the brake booster in the memory so that the predicted negative pressure is used to calculate a charging rate and a discharging rate of the next cycle.

When the predicted negative pressure k of the brake booster is less than or equal to the reference negative pressure of the control for stopping the operation of the air conditioner (Yes in step S9), the controller 10 may determine that the booster negative pressure is insufficient to stop the operation of the air conditioner (step S10).

After the step S10, the controller 10 may return to the step S4 and may calculate a negative pressure of the brake booster of the next cycle until the start of the vehicle is off.

When the predicted negative pressure k of the brake booster exceeds the reference negative pressure of the control for stopping the operation of the air conditioner (No in the step S9), the controller 10 may determine that the booster negative pressure is sufficient not to stop the operation of the air conditioner, and may perform the step S4.

FIGS. 5A-5D are graphs showing a result of predicting the negative pressure of the brake booster according to an exemplary embodiment of the present disclosure.

As described referring to FIG. 1, when only the negative pressure of the intake manifold and the acceleration of the vehicle are used as basic factors for prediction of the booster negative pressure, there is a problem that the predicted value is not similar to the measured value so that the accuracy is deteriorated or the failure occurs.

Referring to FIGS. 5A-5D, there is a limit in covering various cases of operation patterns of the brake pedal with absolute values of the acceleration of the vehicle and the brake pedal force signal.

For example, overall absolute displacements of brake pedal force signals of cases ② and ③ are similar, but discharging amounts corresponding to the brake pedal force signals of the cases ② and ③ are different because waveforms of the brake pedal force signals are different.

However, the exemplary embodiment of the present disclosure may output the predicted value of the negative pressure of the brake booster similar to the measured value of the negative pressure of the brake booster using the charging rate and the discharging rate generated based on the brake pedal force, and may improve the accuracy as much as more than or equal to 90%.

As described above, the exemplary embodiment of the present disclosure may implement the logic for predicting the negative pressure of the brake booster so that the exemplary embodiment of the present disclosure improves cooling performance and braking performance of the vehicle without cost increase due to addition of hardware.

The exemplary embodiment of the present disclosure may calculate the negative pressure of the brake booster based on the charging rate and the discharging rate modeled according to a change of the brake pedal force signal of a driver of the vehicle so that the exemplary embodiment of the present disclosure improves accuracy of the negative pressure of the brake booster to a level similar to a level of a measured value of the brake booster sensor.

In addition, the exemplary embodiment of the present disclosure may forcibly reduce the predicted value of the negative pressure of the brake booster by detecting the repeated braking situation in which the brake pedal operation force signal is continuously changed and an acceleration signal of the vehicle is continuously changed more than or equal to the reference amplitude so that the exemplary embodiment of the present disclosure prevents the failure up to 0%.

The exemplary embodiment of the present disclosure has been described, but the present disclosure is not limited to the above described exemplary embodiment, and various other modifications are possible.

For example, in the above described exemplary embodiment of the present disclosure, it has been described that the controller 10 performs the control for reducing a frequency of stop of the air conditioner using the negative pressure of the brake booster predicted by the booster negative pressure predictor 100.

However, the exemplary embodiment of the present disclosure is not limited thereto, and the booster negative pressure predictor 100 may include a function of a brake booster sensor of an existing vehicle.

In general, a vehicle including an idle stop and go (ISG) system uses the brake booster sensor to restart the vehicle when a pressure of the brake booster becomes insufficient after start of the vehicle is stopped by the ISG system. Therefore, when the brake booster sensor is omitted in the vehicle including the ISG system, the vehicle may use the system for predicting the negative pressure of the brake booster of the vehicle 1 according to an exemplary embodiment of the present disclosure to perform ISG control.

For example, the controller 10 may restart the vehicle when the predicted negative pressure of the brake booster of the step S8 is less than or equal to a reference negative pressure of the ISG control, and the controller may maintain a state in which the start of the vehicle is stopped when the predicted negative pressure of the brake booster exceeds the reference negative pressure.

The exemplary embodiment of the present disclosure is not implemented only by the aforementioned apparatus and/or method, and may be implemented by a program for operating a function corresponding to the configuration of the exemplary embodiment of the present disclosure, a recording medium in which the program is recorded, and the like, and the implementation may be easily realized from the description of the aforementioned exemplary embodiment by those skilled in the art.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A system for predicting a negative pressure of a brake booster of a vehicle, comprising:
   a driving information detector configured to detect driving information according to driving of the vehicle; and
   a controller configured to calculate a negative pressure of an intake manifold based on a pressure of the intake manifold and an atmospheric pressure that is the driving information, the controller including a booster negative pressure predictor configured to predict the negative pressure of the brake booster by integrating over time a change rate according to a charging rate and a discharging rate of the negative pressure of the brake booster calculated using a previous negative pressure of the brake booster, which is calculated in a previous cycle according to a logic for predicting the negative pressure of the brake booster, and the negative pressure of the intake manifold and a brake pedal force of a current cycle,
   wherein the controller is further configured to control the vehicle according to a result of predict the negative pressure of the brake booster.

2. The system of claim 1, wherein, when the predicted negative pressure of the brake booster is less than or equal to a reference negative pressure of a control for stopping an operation of an air conditioner of the vehicle, the controller is configured to determine that the predicted negative pressure of the brake booster is insufficient for stopping the operation of the air conditioner.

3. The system of claim 1, wherein the driving information detector is configured to detect the driving information from at least one of a vehicle speed sensor, a vehicle acceleration sensor, a gear stage sensor, an accelerator pedal sensor, a brake pedal operation sensor, a brake pedal force sensor, a timer, or an atmospheric pressure sensor.

4. The system of claim 1, wherein the booster negative pressure predictor is configured to collect the negative pressure of the intake manifold and the driving information and generate the negative pressure of the brake booster predicted in a cycle of a time period.

5. The system of claim 1, wherein the booster negative pressure predictor comprises:
   a charging model module configured to calculate a first differential pressure over time using the previous negative pressure of the brake booster calculated in the previous cycle and the negative pressure of the intake manifold of the current cycle;
   a discharging model module configured to take a difference between the previous negative pressure of the brake booster calculated in the previous cycle and the negative pressure of the intake manifold of the current cycle as a basic factor, and compensate for the basic factor using the brake pedal force to calculate a second differential pressure over time;
   a summing module configured to calculate a change rate by adding a discharging rate of the negative pressure of the brake booster corresponding to the second differential pressure to a charging rate of the negative pressure of the brake booster corresponding to the first differential pressure; and
   an integration module configured to integrate the change rate over time and output the predicted negative pressure of the brake booster.

6. The system of claim 5, wherein the charging rate of the negative pressure of the brake booster according to the first differential pressure is output as a positive value, and the discharging rate of the negative pressure of the brake booster according to the second differential pressure is output as a negative value.

7. The system of claim 5, wherein the charging model module is configured to calculate the charging rate using a control map using the first differential pressure as an input value.

8. The system of claim 5, wherein the discharging model module is configured to calculate a multiplication factor for correcting the discharging rate using a correction map using a displacement change amount of the brake pedal force as an input value.

9. The system of claim 8, wherein, when repeated braking due to an on state and an off state of a brake operation signal continuously occurs, the discharging model module is configured to use an additional correction amount to increase the discharging rate.

10. The system of claim 9, wherein the discharging model module is configured to use an additional correction amount to increase the discharging rate when the discharging model module continuously detects that an acceleration of the vehicle or a speed of the vehicle has an amplitude greater than or equal to a reference amplitude.

11. The system of claim 5, wherein the integration module is configured to feedback the predicted negative pressure of the brake booster to the charging model module and the discharging model module so that the predicted negative pressure is used to calculate a charging rate and a discharging rate of a next cycle generated after the current cycle.

12. The system of claim 1, wherein the controller is configured to restart the vehicle in a state in which the vehicle has stopped by an idle stop and go (ISG) system when the predicted negative pressure of the brake booster is less than or equal to a reference negative pressure.

13. A method for predicting a negative pressure of a brake booster of a vehicle, comprising:
   a) collecting, by a controller, driving information according to driving of the vehicle to calculate a negative pressure of an intake manifold based on a pressure of the intake manifold and an atmospheric pressure;
   b) calculating, by the controller, a first differential pressure over time using a previous negative pressure of the brake booster calculated in a previous cycle and the negative pressure of the intake manifold of a current cycle;
   c) taking, by the controller, a difference between the previous negative pressure of the brake booster calculated in the previous cycle and the negative pressure of the intake manifold of the current cycle as a basic factor to calculate a second differential pressure over time and compensating for the basic factor using the brake pedal force; and
   d) calculating, by the controller, a change rate by adding a discharging rate of the negative pressure of the brake booster corresponding to the second differential pressure to a charging rate of the negative pressure of the brake booster corresponding to the first differential pressure to predict the negative pressure of the brake booster by integrating the change rate over time,
   wherein the controller is further configured to control the vehicle according to a result of predict the negative pressure of the brake booster.

14. The method of claim 13, wherein step b) comprises setting, by the controller, an initial negative pressure of the brake booster generated when the previous cycle does not exist as a value less than the negative pressure of the intake manifold.

15. The method of claim 13, wherein step b) comprises calculating, by the controller, the charging rate using a control map using the first differential pressure as an input value.

16. The method of claim 13, wherein step c) comprises calculating, by the controller, a multiplication factor for correcting the discharging rate using a correction map using a displacement change amount of the brake pedal force as an input value.

17. The method of claim 13, further comprising after step d), when the predicted negative pressure of the brake booster is less than or equal to a reference negative pressure of a control for stopping an operation of an air conditioner of the vehicle, determining, by the controller, that the predicted negative pressure of the brake booster is insufficient for stopping the operation of the air conditioner.

18. The method of claim 13, further comprising after step d), restarting, by the controller, the vehicle in a state in which start of the vehicle is stopped by an idle stop and go (ISG) system when the predicted negative pressure of the brake booster is less than or equal to a reference negative pressure.

* * * * *